G. T. FLEMING.
SAFETY HOOK.
APPLICATION FILED NOV. 8, 1920.
1,389,582. Patented Sept. 6, 1921.
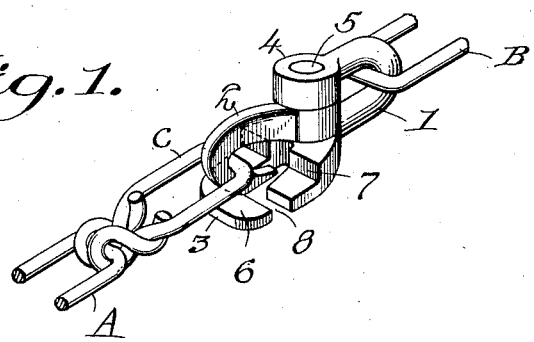
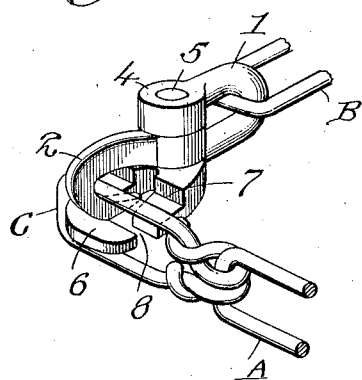
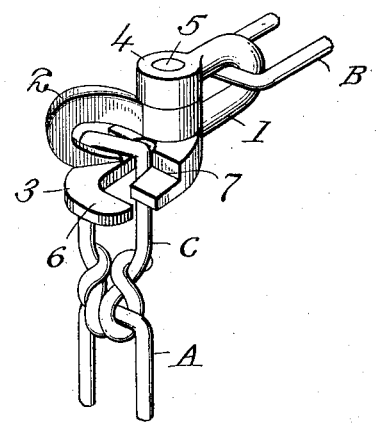
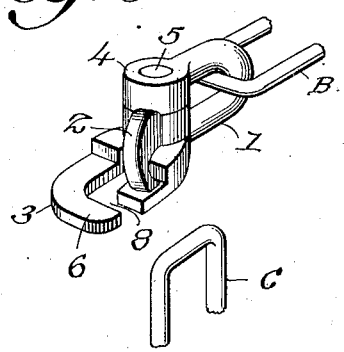
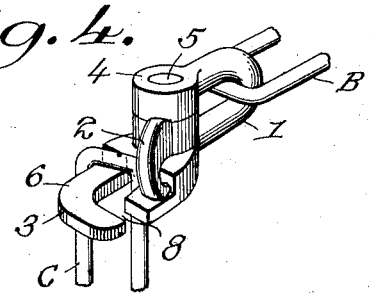
Inventor
George T. Fleming,
by Henry T. Bright
Attorney

UNITED STATES PATENT OFFICE.

GEORGE T. FLEMING, OF LA GRANDE, OREGON.

SAFETY-HOOK.

1,389,582.     Specification of Letters Patent.     Patented Sept. 6, 1921.

Application filed November 8, 1920. Serial No. 422,439.

*To all whom it may concern:*

Be it known that I, GEORGE T. FLEMING, a citizen of the United States, and resident of La Grande, in the county of Union, and State of Oregon, have invented certain new and useful Improvements in Safety-Hooks, of which the following is a specification.

In general terms my invention relates to improvements in hook fasteners of the type embodying means for preventing accidental or surreptitious removal of a chain or other object engaged thereby.

For the sake of illustration I have shown and described hereinafter a particular application of my invention, namely; as applied to anti-skid chains for automobiles. It is commonly known that the fastening means for anti-skid chains now generally used are apt to become unfastened when contacting with obstructions in a road bed, and the usual snap-hooks have been found too fragile for adaptation to this purpose. Furthermore, thieves who make a practice of stealing automobile accessories and the like oftentimes remove the anti-skid chains from the tires to which they are applied, and my present invention is designed to prevent such surreptitious removal in that its manipulation requires some little skill and familiarity with the manner of releasing an object engaged thereby.

Therefore, and more briefly, the principal objects of my invention are: to provide a strong and effective lock for fastening hooks whereby to positively prevent displacement of objects engaged thereby; to provide means whereby removal of an object engaged by the hook is prevented except by one familiar with the manner of manipulating the lock or guard; and to provide a lock or guard which also serves as a protective member for the hook to prevent the hook from becoming broken through contact with objects in a roadbed when it is used with anti-skid chains.

To these and other ends, my invention consists in the construction, combination and arrangement of parts described hereinafter and pointed out in the claims.

One embodiment of my invention is represented by way of example in the accompanying drawings, wherein:—

Figure 1 is a perspective view of the hook as applied to a known type of anti-skid chain; and Figs. 2, 3, 4 and 5 show the successive steps in disposing a chain end in the hook and in removing it from the hook.

In the drawings like characters of reference refer to like or similar parts throughout the several views, in which:—

(A) designates a section of what is commercially known as the Weed anti-skid chain, one terminal B of which is engaged within the shackle 1 of my hook, and the other terminal C of which is adapted to be engaged by my hook designated 2.

The shackle 1 is preferably U shaped as illustrated and one end 3 thereof is of greater length than the other end 4. Between the two ends 3 and 4 my hook 1 is pivotally mounted on the stud 5 and extends with its open portion facing the long end 3 of the shackle and riding closely thereagainst so that an object cannot be removed from engagement with the hook except as hereinafter described.

The long end 3 of the shackle is enlarged and flattened out to form an oval guard member 6, one face of which is cut away as at 7 to permit movement of the hook 1 thereover. The guard member is further provided with a bayonet slot 8, the entering portion of which opens from the side of the guard to permit insertion of a chain end when it is desired to insert or remove the same from the hook.

In inserting a chain end in the hook the hook 1 is turned away from the entering portion of the bayonet slot 8 (see Fig. 5) and the chain end C is then inserted in the slot as illustrated in Fig. 4 and moved backward toward the shackle 1. The hook is then turned across the bayonet slot (see Fig. 3) and the chain end withdrawn from the slot and engaged within the hook (see Fig. 2), after which it may be readily moved to the position shown in Fig. 1. Attention is called to the fact that at no time is the opening in the hook absolutely clear of the guard, and only sufficient clearance between the hook end and the closed terminal of the bayonet slot is permitted to allow insertion of the chain end.

In removing the chain end the hook is turned toward and past the open portion of the bayonet slot 8 and the chain end is moved within the bayonet slot until it reaches the closed end thereof, whereupon the hook is turned across and away from the open portion of the bayonet slot, so that the chain end may be removed therefrom as shown in Fig. 5. In other words to remove the chain the operation of applying it to the hook is merely reversed.

From the foregoing it will be seen that accidental displacement of an object from the hook 1 is positively prevented, while surreptitious removal is to a large degree guarded against by the peculiar method of manipulating the device.

While there has been illustrated in the accompanying drawing and described in the specification such combination and arrangement of parts as constitute the preferred embodiment of my invention, it is nevertheless desired to emphasize the fact that interpretation of the invention should only be conclusive when made in the light of the subjoined claims.

Having described the invention and its objects with such attention to detail as will thoroughly acquaint one skilled in the art with its construction and advantages, I claim—

1. A fastener comprising a guard, a hook pivoted thereto and movable across the guard, said guard and hook being constantly disposed relatively in planes at right angles to each other.

2. A fastener comprising a guard, a hook pivoted thereto and movable across the guard within limits defined by the width of the latter, said guard and hook being constantly disposed relatively in planes at right angles to each other, said guard normally closing said hook, and means associated with the guard permitting an element to be engaged with and disengaged from said hook.

3. A fastener comprising a guard, a hook pivoted thereto and movable across the guard, said guard and hook being constantly disposed relatively in planes at right angles to each other, said guard having a slot therein permitting an element to be engaged with and disengaged from said hook.

4. A fastener including a pair of connected relatively movable members, one of which is in the form of a hook and the other in the form of a guard closing the hook, said guard member having a slot therein through which an element must be passed to be engaged with or disengaged from said hook member, the latter being movable within limits defined by the width of the guard member, the open portion of said hook member being at all times in registration with said slot irrespective of the relative relation of said members.

5. A fastener including a pair of connected relatively movable members, one of which is in the form of a hook and the other in the form of a guard closing the hook, said guard member having a slot therein through which an element must be passed to be engaged with or disengaged from said hook member, movement of a portion of the hook member entirely across said slot being essential to permit an element to be engaged with or disengaged from said hook member.

6. A fastener including a pair of connected relatively movable members, one of which is in the form of a hook and the other in the form of a guard closing the open portion of the hook, said guard member having a slot therein through which an element must be passed to be engaged with or disengaged from said hook member, the open portion of the hook being at all times closed by the guard with respect to the entrance portion of said slot.

7. A fastener including a pair of connected relatively movable members, one of which is in the form of a hook and the other in the form of a guard for said hook, said guard member having a slot therein through which an element must be passed to be engaged with or disengaged from said hook member, a portion of said hook being disposed normally in alinement with and closing said slot against the passage of an element therethrough to be engaged with or disengaged from said hook.

8. A fastener including a pair of members, one of which is in the form of a hook and the other in the form of a guard for said hook, said members being relatively pivoted whereby the hook may be swung from one side to the other of said guard member within limits defined by the width of the guard, said hook including an open portion facing the guard adjacent the axis of pivotal connection of the members, said guard having an angular slot therein opening through one edge thereof and the inner end of which terminating so as to be constantly in registration with the open portion of the hook irrespective of the position of the latter with respect to the guard, the open portion of the hook being at all times closed by the guard with respect to the entrance portion of said slot.

9. A fastener including a U-shaped shackle provided with ends of unequal length, a hook pivoted between the ends, the longer end being flattened and provided with a bayonet slot and normally closing the opening in the hook, and said hook being movable within limits defined by the breadth of the long end to permit insertion and removal of objects to and from the hook through the bayonet slot.

In testimony whereof I hereunto affix my signature.

GEORGE T. FLEMING.